(12) United States Patent
Kaneko et al.

(10) Patent No.: US 6,415,038 B1
(45) Date of Patent: Jul. 2, 2002

(54) IMAGE ANALYZING APPARATUS

(75) Inventors: Takashi Kaneko; Masato Some, both of Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 08/433,643

(22) Filed: May 4, 1995

(30) Foreign Application Priority Data

May 20, 1994 (JP) .............................. 6-130941

(51) Int. Cl.[7] ................................ G06K 9/00
(52) U.S. Cl. ......................... 382/100; 702/32
(58) Field of Search ................. 345/179, 629; 364/927.2, 927.4; 382/130, 132, 128, 171, 173, 172, 274, 100, 189, 311; 395/155; 250/583, 584; 348/135; 359/196; 378/54; 702/19, 32, 23

(56) References Cited

U.S. PATENT DOCUMENTS

| | | | |
|---|---|---|---|
| 4,865,967 A | 9/1989 | Shiraishi et al. | 435/6 |
| 5,028,793 A | 7/1991 | Lindmayer et al. | 250/484.1 |
| 5,260,190 A | 11/1993 | Shiraishi et al. | 435/6 |
| 5,262,945 A | 11/1993 | Decarli et al. | 364/413.13 |
| 5,270,162 A | 12/1993 | Shiraishi et al. | 435/6 |

FOREIGN PATENT DOCUMENTS

| | | | |
|---|---|---|---|
| GB | A2246197 | 1/1992 | G01N/21/76 |
| JP | 5915843 | 1/1984 | G01N/23/20 |
| JP | 6151738 | 3/1986 | H01J/37/22 |
| JP | 6193538 | 5/1986 | H01J/37/20 |

OTHER PUBLICATIONS

Proceedings of the SPIE—The International Society for Optical Engineering Conf: Medical Imaging II, vol. 914, PT B, Jan. 31, 1988, Newport Beach, CA, pp. 1210–1217; Chang et al., *Displaytool: An Image Display Utility for Sun Workstations*.

International Journal of Bio–Medical Computing, vol. 10, No. 1, Jan. 1979, Netherlands, pp. 23–28, Maayan et al., *Computer Image Analysis of Kidney Histopathological Sections*.

Primary Examiner—Jayanti K. Patel
(74) Attorney, Agent, or Firm—Sughrue Mion, PLLC

(57) ABSTRACT

An image analyzing apparatus for forming images on a CRT based on image data and effecting quantitative analysis includes an image density lower limit setting section for setting a lower limit value of image density, an image density upper limit setting section for setting an upper limit value of image density and an image area specifying section for specifying image areas having density equal to or higher than the lower limit value of image density set by the image density lower limit setting means and equal to or lower than the upper limit value of image density set by the image density upper limit setting means from among the images displayed on the CRT. According to the thus constituted image analyzing apparatus, it is possible to specify a desired image area and quantitatively analyze the image area.

13 Claims, 10 Drawing Sheets

IMAGE ANALYZING APPARATUS

BACKGROUND OF THE INVENTION

The present invention relates to an image analyzing apparatus and, particularly, to such an apparatus which can quantitatively analyze images in a desired manner.

DESCRIPTION OF THE PRIOR ART

Various image analyzing methods are known. These include an autoradiographic process comprising the steps of introducing a radioactively labeled substance into an organism, using the organism or a part of the tissue of the organism as a specimen, placing the specimen and a radiographic film such as a high sensitivity type X-ray film together in layers for a certain period of time to expose the radiographic film thereto and obtaining locational information on the radioactively labeled substance in the specimen from the resolved pattern of the radiographic film, a chemiluminescent process comprising the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, detecting the chemiluminescent emission in the wavelength of visible light generated by the contact of the chemiluminescent substance and the labeling substance and obtaining information relating to the high molecular substance such as genetic information, a detecting method using an electron microscope comprising the steps of irradiating a metal or nonmetal specimen with an electron beam, detecting a diffraction image, transmission image or the like and effecting elemental analysis, composition analysis of the specimen, structural analysis of the specimen or the like, or irradiating the tissue of an organism with an electron beam and detecting an image of the tissue of the organism, and a radiographic diffraction image detecting process comprising the steps of irradiating a specimen with radiation, detecting a radiographic diffraction image and effecting structural analysis of the specimen or the like.

Conventionally, these methods are carried out by employing a photographic film as a detecting material, recording a radiographic image, a chemiluminescent image, an electron microscopic image, a radiographic diffraction image or the like on the photographic film and observing a visual image with the eyes. However, in the case where a photographic film is employed as a detecting material, since a radiographic film has low sensitivity, there is a problem that it takes considerable time for recording an image in the autoradiographic process and the radiographic diffraction image detecting process. Further, in the chemiluminescent process, although it is necessary to employ a highly sensitive film having a high gamma value for detecting very weak chemiluminescent emission, when the highly sensitive film having a high gamma value is employed, it is difficult to expose the film reliably using a straight portion of the characteristic curve. Therefore, the film is often exposed improperly and it is necessary to repeatedly expose the films under various exposure conditions. Moreover, in the detecting process using the electron microscope, since the straight portion of the characteristic curve of a photographic film for an electron microscope is short, it is difficult to determine the proper exposure condition and it is necessary to repeatedly expose the films. Furthermore, in either processes, it is indispensable to chemically develop the films and, therefore, the operations are unavoidably complicated.

In view of the above, there have been proposed an autoradiographic process, a chemiluminescent process, a detecting process using an electron microscope and a radiographic diffraction image detecting process comprising the steps of employing, as a detecting material for the radiation, the visible light, the electron beam or the like, not a photographic film, but a stimulable phosphor which can absorb and store the energy of radiation, visible light, an electron beam or the like upon being irradiated therewith and release a stimulated emission whose amount is proportional to that of the received radiation, the visible light, the electron beam or the like upon being stimulated with an electromagnetic wave having a specific wavelength range, photoelectrically detecting the stimulated emission released from the stimulable phosphor, converting the detection signal to a digital signal, effecting a predetermined image processing on the obtained image data and reproducing an image on displaying means such as a CRT or the like or a photographic film (See for example, Japanese Patent Publication No. 1-60784, Japanese Patent Publication No. 1-60782, Japanese Patent Publication No. 4-3952, U.S. Pat. No. 5,028,793, UK Patent Application 2,246,197 A, Japanese Patent Application Laid Open No. 61-51738, Japanese Patent Application Laid Open No. 61-93538, Japanese Patent Application Laid Open No. 59-15843 and the like).

According to the detecting processes using the stimulable phosphor, development, which is a chemical processing, becomes unnecessary. In addition, the exposure time can be markedly shortened in the autoradiographic process and the radiographic diffraction image detecting process. Improper exposure becomes rare and the exposing operation becomes easy in the chemiluminescent process and the detecting process using the electron microscope. Further, since the image is reproduced after the detected signal has been converted to a digital signal, the image can be reproduced in a desired manner by effecting signal processing on image data and it is also possible to effect quantitative analysis using a computer. Use of a stimulable phosphor in these process is therefore advantageous.

In the autoradiographic process, the chemiluminescent process and the detecting process using the electron microscope and the radiographic diffraction image detecting process, it is often required for quantitatively analyzing images to specify a particular image area and add up the density of the pixels in the image area.

In the case where the quantitative analysis is effected using display means such as a CRT, only a density equal to or higher than a predetermined value can be specified in conventional image analyzing apparatuses and, therefore, if there is an image area whose density is higher than that of the image area to be quantitatively analyzed in the image, it is impossible to specify a desired image area and quantitatively analyze the image area.

The same problems occur in the case where, after an autoradiographic image, a chemiluminescent image, an electron microscopic image, a radiographic diffraction image or the like was recorded on a photographic film, the recorded image is photoelectrically read and converted to a digital signal and the thus obtained image signal is signal processed in a desired manner, thereby reproducing a visible image on displaying means such as a CRT or the like or a photographic film.

SUMMARY OF THE INVENTION

It is therefore an object of the present invention to provide an image analyzing apparatus for forming images on display means such as a CRT based on image data and quantitatively analyzing the images, which can specify a desired image area and quantitatively analyze the image area.

The above and other objects of the present invention can be accomplished by an image analyzing apparatus for forming images on display means based on image data and effecting quantitative analysis comprising image density lower limit setting means for setting a lower limit value of image density, image density upper limit setting means for setting an upper limit value of image density and image area specifying means for specifying image areas having density equal to or higher than the lower limit value of image density set by the image density lower limit setting means and equal to or lower than the upper limit value of image density set by the image density upper limit setting means from among the images displayed on the display means.

In a preferred aspect of the present invention, the image analyzing apparatus further comprises image area outline specifying means for specifying an outline of the image area to be quantitatively analyzed and the image area specifying means is adapted to specify an image area having density equal to or higher than the lower limit value of image density set by the image density lower limit setting means and equal to or lower than the upper limit value of image density set by the image density upper limit setting means in the image contained in the image area within the outline specified by the image area outline specifying means.

In a further preferred aspect of the present invention, the image analyzing apparatus further comprises image data storing means for storing image data and memory means for two-dimensionally mapping and temporarily storing the image data stored in the image data storing means and the image area specifying means is adapted to data-process the image data within an image data area corresponding to an image area specified thereby and stored in the memory means so that the image area can be displayed on the display means with predetermined density.

In a further preferred aspect of the present invention, the image analyzing apparatus further comprises graphic data storing means for storing graphic data corresponding to patterns to be displayed on the display means and the image area outline specifying means is adapted to specify the outline of the image area to be analyzed based on the graphic data stored in the graphic data storing means.

In a further preferred aspect of the present invention, the memory means comprises temporary memory means for two-dimensionally mapping and temporarily storing image data stored in the image data storing means, selected image data memory means for two-dimensionally mapping and temporarily storing a part of the image data stored in the temporary memory means and enlarged, reduced or unchanged in scale, synthesized data memory means for two-dimensionally mapping and temporarily storing data obtained by synthesizing the image data stored in the selected image data memory means and graphic data stored in the graphic data storing means and window memory means for two-dimensionally mapping and temporarily storing a part of the image data stored in the synthesized data memory means, and the image analyzing apparatus further comprises image data selecting means for selecting a part of the image data stored in the temporary memory means, image data enlarging/reducing means for enlarging or reducing the image data selected by the image data selecting means, data synthesizing means for synthesizing the image data stored in the selected image data memory means and graphic data stored in the graphic data storing means and two-dimensionally mapping and temporarily storing them in the synthesized data memory means and data area selecting means for selecting a part of the areas of the image data and the graphic data stored in the synthesized data memory means and two-dimensionally mapping and temporarily storing said part in the window memory means, and the image area specifying means is adapted to data-process the image data stored in the window memory means so as to specify image areas having density equal to or higher than the lower limit value of image density set by the image density lower limit setting means and equal to or lower than the upper limit value of image density set by the image density upper limit setting means from among the images displayed on the display means.

In a further preferred aspect of the present invention, the image data are produced using a stimulable phosphor sheet.

In a further preferred aspect of the present invention, the image data are constituted by image data selected from a group consisting of autoradiographic image data, radiographic diffraction image data, electron microscopic image data and chemiluminescent image data.

In a still further preferred aspect of the present invention, the autoradiographic image data, the radiographic diffraction image data and the electron microscopic image data are produced by absorbing and storing the energy of a radiation or an electron beam emitted from a specimen in a stimulable phosphor, irradiating the stimulable phosphor with an electromagnetic wave and photoelectrically converting light emitted from the stimulable phosphor.

In a further preferred aspect of the present invention, the chemiluminescent image data are produced by absorbing and storing the energy of a visible light emitted from a specimen in a stimulable phosphor, irradiating the stimulable phosphor with an electromagnetic wave and photoelectrically converting light emitted from the stimulable phosphor.

In the present invention, the stimulable phosphor employed for producing an autoradiographic image, a radiographic diffraction image and an electron microscopic image may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x},M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce.) disclosed in Japanese Patent Application Laid Open No. 2-276997, europium activated complex halide phosphors $BaFX.xNaX':aEu^{2+}$ (where each of X or X' is at least one halogen selected from the group consisting of Cl, Br and I; x is greater than 0 and equal to or less than 2; and y is greater than 0 and equal to or less than 0.2.) disclosed in Japanese Patent Application Laid Open No. 589-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1.) disclosed in U.S. Pat. No. 4,539,137 and europium activated complex halide phosphors $M''FX \cdot aM'X' \cdot bM''X''_2 \cdot cM'''X'''_3 \cdot xA:yEu^{2+}$ (where $M''$ is at least one alkaline earth metal selected from the group consisting of Ba, Sr and Ca; $M'$ is at least one alkaline metal selected from the group consisting of Li, Na, K, Rb and Cs; $M''$ is at least one divalent metal selected from the group consisting of Be and Mg; $M'''$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2.) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include metal halophosphates, rare-earth-activated phosphors, aluminate-host phosphors, silicate-host phosphors and fluoride-host phosphors disclosed in UK Patent Application 2,246,197 A.

The above and other objects and features of the present invention will become apparent from the following description made with reference to the accompanying drawings.

DESCRIPTION OF THE PREFERRED EMBODIMENTS

Figure 1:
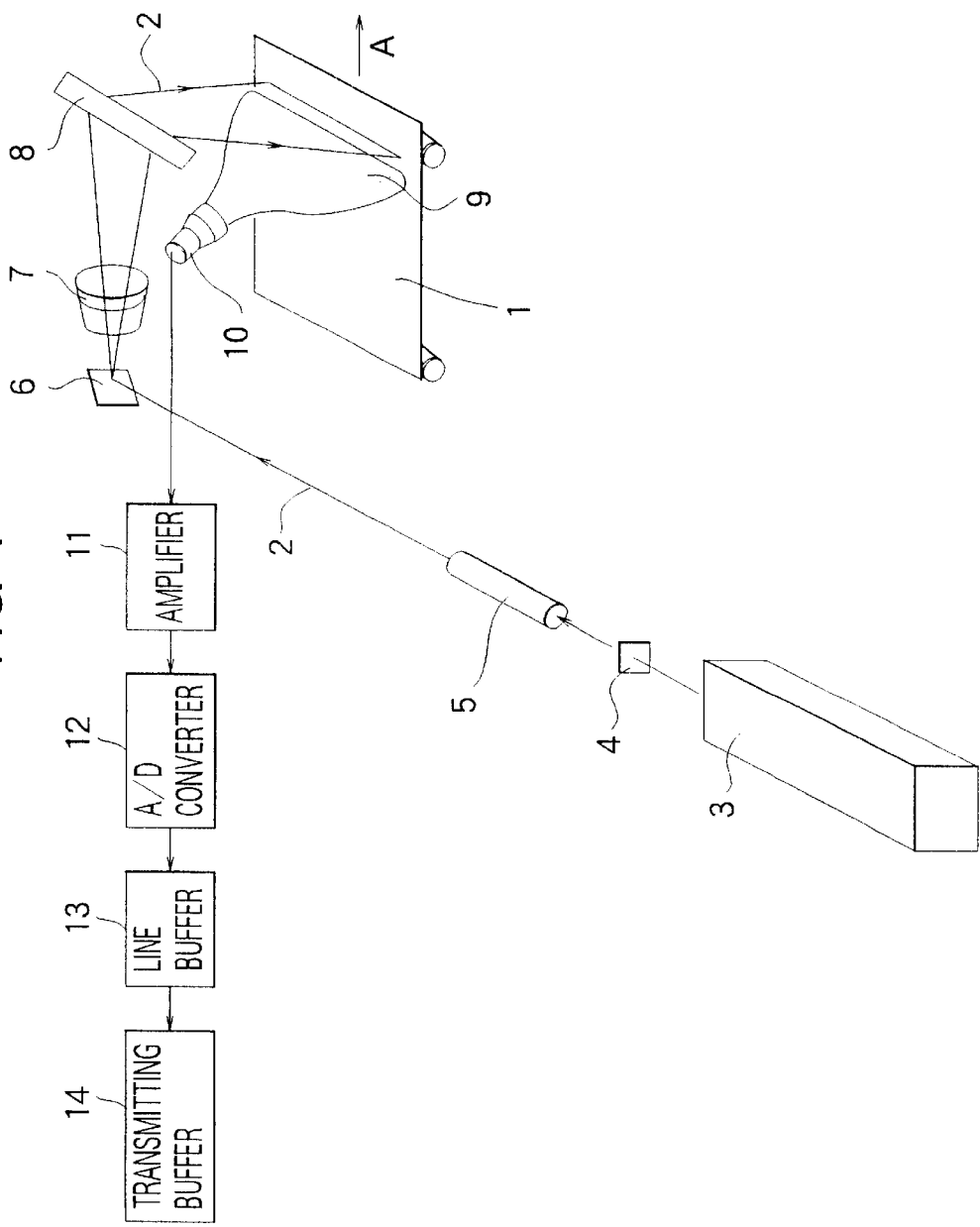
FIG. 1 is a schematic perspective view showing an image reading apparatus for producing image data to be analyzed by an autoradiographic image analyzing apparatus which is an embodiment of the present invention.

A stimulable phosphor sheet 1 shown in FIG. 1 stores locational information regarding radioactive labeling material contained in a specimen (not shown) in the form of radioactive energy. In this embodiment, the stimulable phosphor sheet 1 stores locational information regarding a radioactively labeled substance contained in a gene produced by the Southern blotting method and the hybridization method. Locational information as termed here includes a variety of information relating to the location of radioactive labeled substances, or aggregations thereof, present in a specimen, such as the location, the shape, the concentration, the distribution or combinations thereof.

In this embodiment, the stimulable phosphor sheet 1 stores and records locational information regarding a radioactively labeled substance for studying the metabolism, absorption, excretion path and state of a substance introduced into a test mouse.

The stimulable phosphor sheet which stores the locational information regarding a radioactive material in the specimen in this manner is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is accurately adjusted by a beam expander 5 and the laser beam 2 enters a beam deflector 6 such as a galvanometer. The laser beam 2 deflected by the beam deflector 6 passes through an fθ lens 7 and is reflected by a plane reflecting mirror 8, thereby impinging upon the stimulable phosphor sheet 1. The fθ lens 7 ensures that the stimulable phosphor sheet 1 is always scanned with the laser beam 2 at a uniform beam speed.

Figure 4:
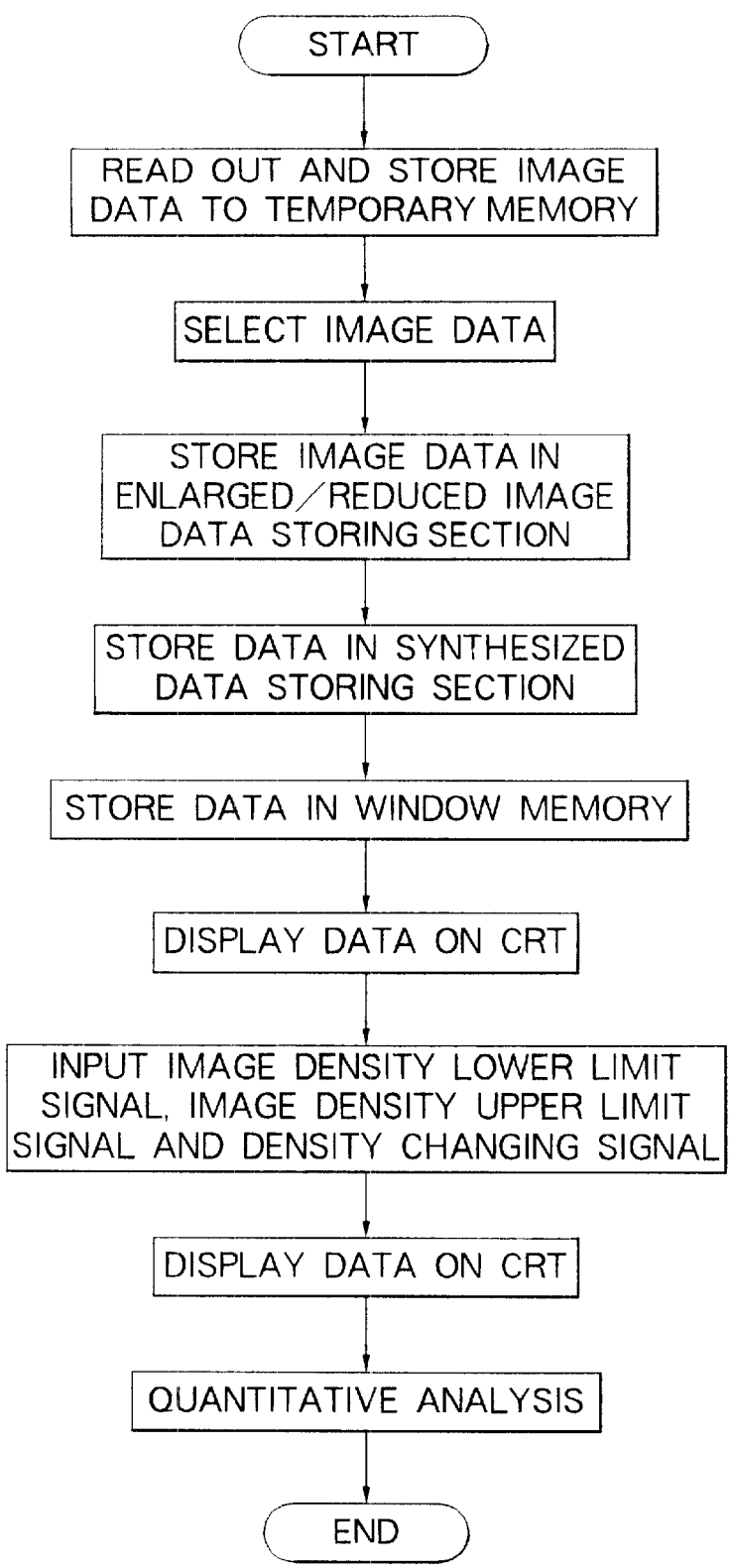
FIG. 4 is a flow chart showing one example of the quantitative analysis procedure effected by an autoradiographic image analyzing apparatus which is an embodiment of the present invention.

The stimulable phosphor sheet 1 is conveyed in the direction along the arrow in FIG. 4 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as an acrylic synthetic resin and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts off light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an A/D converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image forming apparatus.

Figure 2:
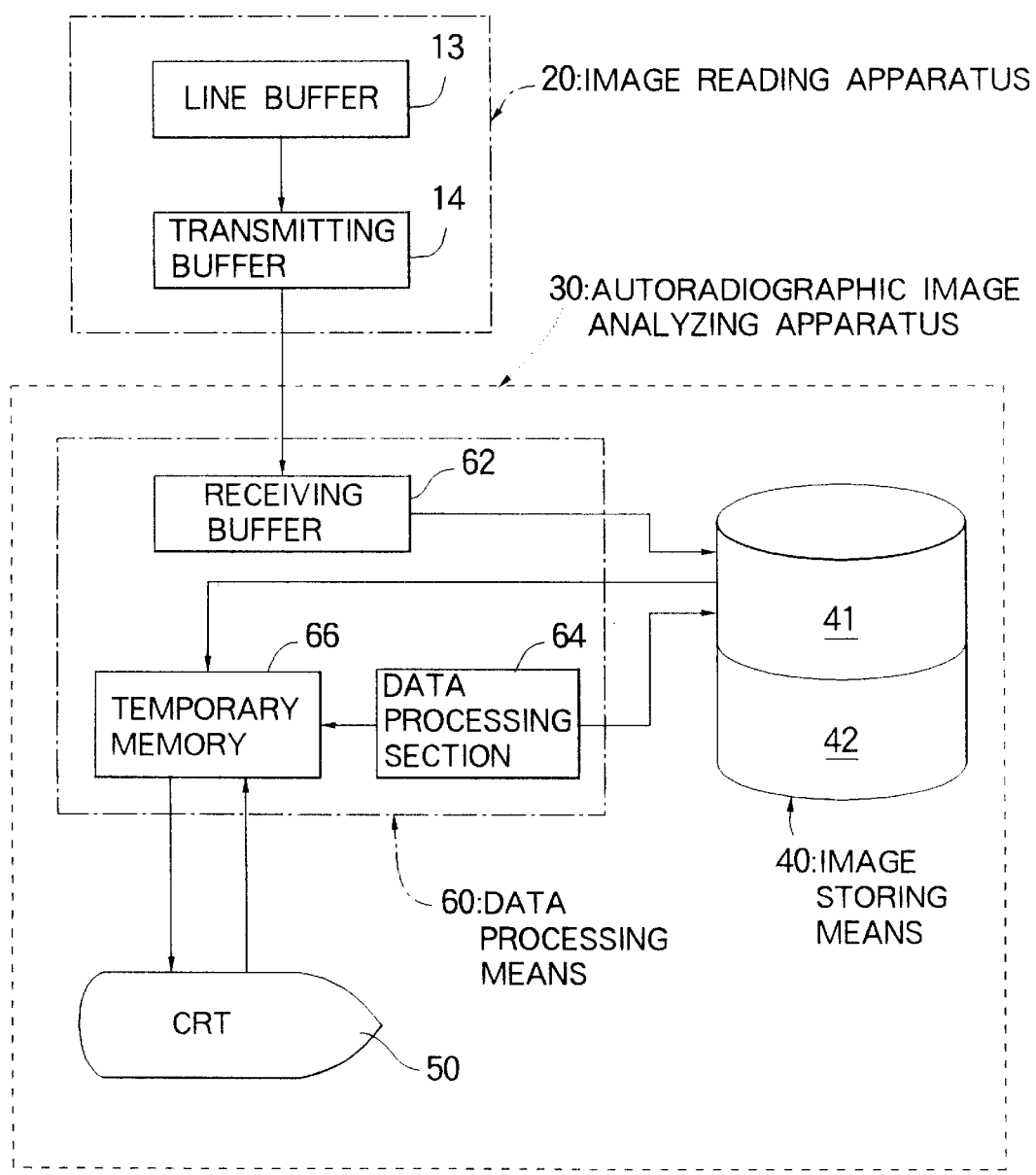
FIG. 2 is a block diagram of an autoradiographic image analyzing apparatus and an image reading apparatus.

FIG. 2 is a block diagram of the autoradiographic image forming apparatus and an image reading apparatus.

As shown in FIG. 2, the autoradiographic image forming apparatus 30 includes data processing means 60 for receiving image data containing locational information regarding radioactive labeling material contained in a specimen, which were stored and recorded in the stimulable phosphor sheet 1, read out by the image reading apparatus 20 and converted to a digital signal, and processing them so as to reproduce a visible image which has desirable density, tone, contrast and the like, and has excellent observation and analysis property, image data storing means 40 for storing image data which were input to the data processing means 60 from the image reading apparatus 20 and processed thereby, and a CRT 50 for reproducing an image based on the image data containing locational information regarding radioactive labeling material contained in a specimen.

The image data temporarily stored in the transmitting buffer 14 of the image reading apparatus 20 are input to a receiving buffer 62 in the data processing means 60 of the autoradiographic image analyzing apparatus 30 and temporarily stored therein. When a predetermined amount of the image data have been stored, the stored image data are output to an image data temporary storing section 41 in the image data storing means 40 and stored therein. In this manner, the image data fed from the transmitting buffer 14 of the image reading apparatus 20 to the receiving buffer 62 of the data processing means 60 and temporarily stored therein are fed from the transmitting buffer 14 to the image data temporary storing section 41 in the image data storing means 40. When the image data obtained by scanning the whole surface of the stimulable phosphor sheet 1 with the laser beam 2 have been stored in the image data temporary storing section 41 in the image data storing means 40, the data processing section 64 in the data processing means 60 reads the image data from the image data temporary storing section 41 and stores them in a temporary memory 66 in the data processing means 60. After the image data were subjected to necessary data processing in the data processing section 64, the data processing section 64 stores only the processed image data in a image data storing section 42 in the image data storing means 40. The data processing section 64 then erases the image data stored in the image data temporary storing section 41.

The image data stored in the image data storing section 42 in the image data storing means 40 can be read by the data processing section 64 and displayed on the CRT 50 so that an operator can view and analyze the image.

Figure 3:
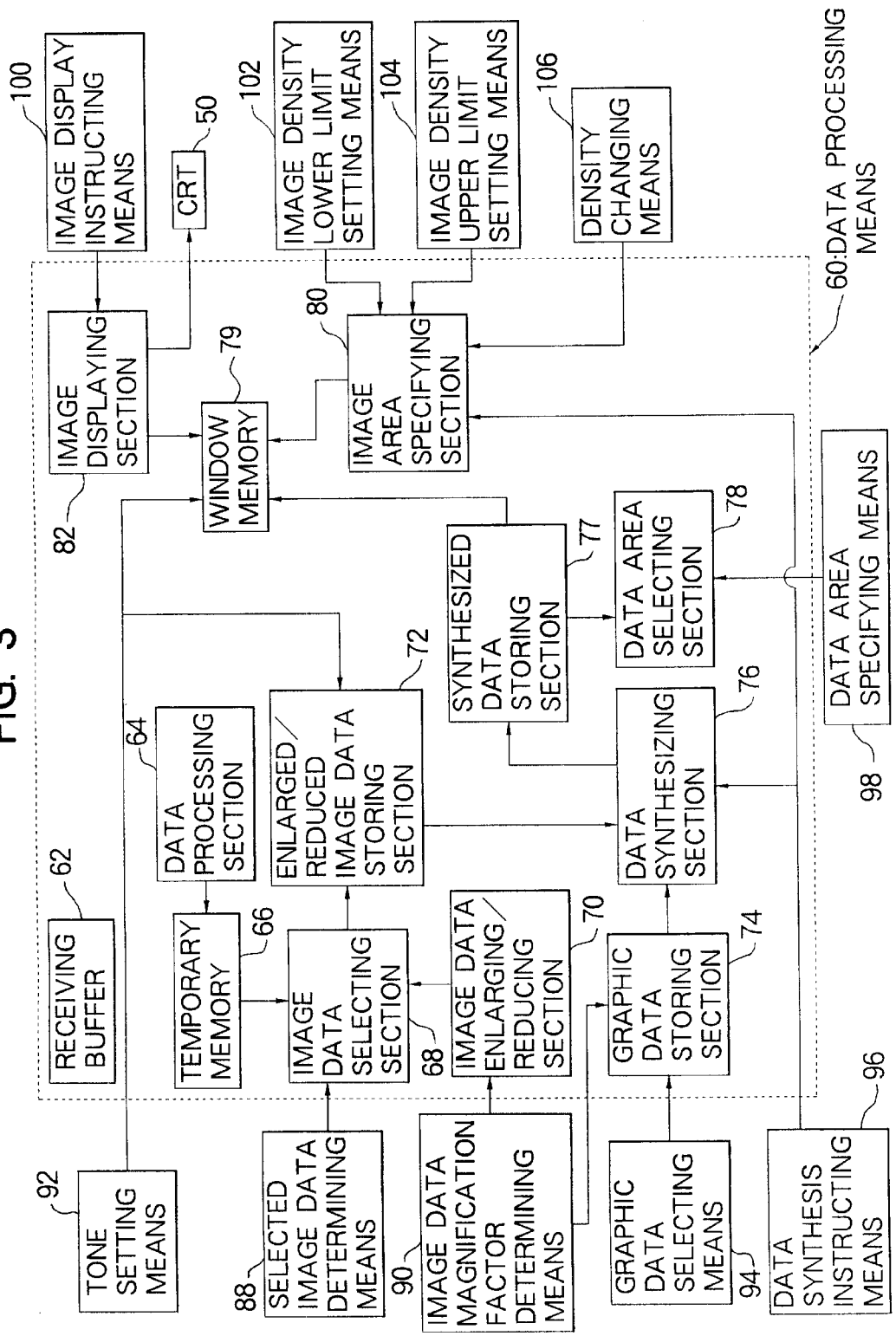
FIG. 3 is a block diagram of data processing means.

FIG. 3 is a block diagram of the data processing means 60.

As shown in FIG. 3, the data processing means 60 includes the receiving buffer 62 for receiving image data from the transmitting buffer 14 in the image reading apparatus 20, the data processing section 64 for effecting data processing and the temporary memory 66 for two-dimensionally mapping image data and temporarily storing them.

The data processing means 60 further includes an image data selecting section 68 for selecting a part of the image data from among the image data temporarily stored in the temporary memory 66, an image data enlarging/reducing section 70 for enlarging or reducing the image data selected by the image data selecting section 68, an enlarged/reduced image data storing section 72 for two-dimensionally mapping and temporarily storing the image data enlarged or reduced by the image data enlarging/reducing section 70, a graphic data storing section 74 for storing various graphic data to be displayed on the CRT 50, a data synthesizing section 76 for synthesizing the image data temporarily stored in the image data enlarging/reducing section 70 and the graphic data stored in the graphic data storing section 74 and to be displayed on the CRT 50, a synthesized image data storing section 77 for two-dimensionally mapping and temporarily storing the image data and the graphic data synthesized by the data synthesizing section 76, a data area selecting section 78 for selecting a predetermined data area from among the image data and the graphic data temporarily stored in the synthesized image data storing section 77, a window memory 79 for two-dimensionally mapping and temporarily storing the data in the data area of the image data and graphic data selected by the data area selecting section 78, an image area specifying section 80 for data processing image data stored in the window memory 79 and a image displaying section 82.

As shown in FIG. 3, an image data selecting signal is input to the image data selecting section 68 from selected image data determining means 88, and an enlarging/reducing signal is input to the image data enlarging/reducing section 70 from the image data magnification factor determining means 90. Further, a graphic data selecting signal from graphic data selecting means 94 and the enlarging/reducing signal from the image data magnification factor determining section 90 are input to the graphic data storing section 74 and a data synthesizing signal is input to the data synthesizing section 76 from data synthesis instructing means 96 which determines what graphic data should be selected and how the image data and the graphic data are to be synthesized to be displayed on the CRT 50. Moreover, a data area specifying signal is input to the data area selecting section 78 from data area specifying means 98 and a tone setting signal is input to the enlarged/reduced image data storing section 74 and the window memory 79 from the tone setting means 92. Further, an image display instructing signal is input to the image displaying section 82 from image display instructing means 100. Furthermore, the data synthesizing signal is input to the image area specifying section 80 from the data synthesis instructing means 96 and the image area specifying section 80 receives an image density lower limit setting signal from image density lower limit setting means 102 which sets the lower limit value of image density and an image density upper limit setting signal from image density upper limit setting means 104 which sets the upper limit value of image density so that image data stored in the window memory 79 are data processed and an image area having predetermined density is specified on the CRT 50 by the image area specifying section 80. A density changing signal is further input to the image area specifying section 80 from a density changing means 106 which, when the graphic data selection signal is input from the graphic data selecting means 94, changes to a desired density the density of an image area surrounded by a pattern corresponding to the graphic data selected by the graphic data selecting means 94 and whose density is equal to or higher than the image density lower limit value set by the image density lower limit setting means 102 and equal to or lower than the image density upper limit value set by the image density upper limit setting means.

In this embodiment, the selected image data determining section 88, the image data magnification factor determining section 90, the tone setting section 92, the graphic data selecting means 94, the data synthesis instructing means 96, the data area specifying means 98, the image display instructing means 100, the image density lower limit setting means 102, the image density upper limit setting means 104 and the density changing means 106 can be operated by a mouse (not shown).

FIG. 4 is a flow chart showing an example of the quantitative analysis of a specified image area having predetermined density in an image displayed on the CRT 50 according to the autoradiographic image analyzing apparatus which is an embodiment of the present invention.

First, image data to be displayed on the CRT 50 are read out from the image storing section 42 of the image storing means 40 to the temporary memory 66 and two-dimensionally mapped and temporarily stored therein. When the operator inputs an image data selecting signal to the image data selecting section 68 by operating the selected image data determining means 88 with a mouse, image data containing an image area to be viewed and analyzed are selected from among the image data two-dimensionally mapped and temporarily stored in the temporary memory 66. As occasion demands, the operator inputs an enlarging/reducing signal to the image data enlarging/reducing section 70 by operating the image data magnification factor determining means 90 to enlarge or reduce the selected image data and two-dimensionally maps and temporarily stores them in the enlarged/reduced image data storing section 72. Further, the operator sets the tone of the image to be displayed on the CRT 50 by operating the tone setting means 92. Then, the operator two-dimensionally maps and temporarily stores the image data stored in the enlarged/reduced image data storing section 72 in the synthesized data storing section 77, without synthesizing graphic data with them, by operating the data synthesis instructing means 96. Next, the operator inputs a data area specifying signal to the data area selecting section 78 by operating the data area specifying means 98 to select the area of the image data to be displayed on the CRT 50, thereby two-dimensionally mapping and temporarily storing it in the window memory 79. Thus, when an image display instructing signal is input from the image display instructing means 100, the image data two-dimensionally mapped and temporarily stored in the window memory 79 are displayed on the CRT 50 by the image displaying section 82 and an image is reproduced on the CRT 50 so as to have the tone set by the tone setting means 92.

When the image having the desired tone has been displayed on the CRT 50 in this manner, the operator views the displayed image and determines an image area to be quantitatively analyzed and the upper limit value and the lower limit value of the density the image area has. Then, the operator inputs a image density lower limit setting signal to the image area specifying section 80 by operating the image density lower limit setting means 102 and inputs an image density upper limit setting signal to the image area specifying section 80 by operating the image density upper limit setting means 104, thereby setting the density of the image area to be quantitatively analyzed to be equal to or higher than the image density lower limit value set by the image density lower limit setting means 102 and equal to or lower than the image density upper limit value set by the image density upper limit setting means 104. Further, the operator inputs a density changing signal to the image area specifying section 80 by operating the density changing means 106 to change to a desired density the density of the image area having the density equal to or higher than the image density lower limit value set by the image density lower limit setting means 102 and equal to or lower than the image density upper limit value set by the image density upper limit setting means 104.

Figure 5:
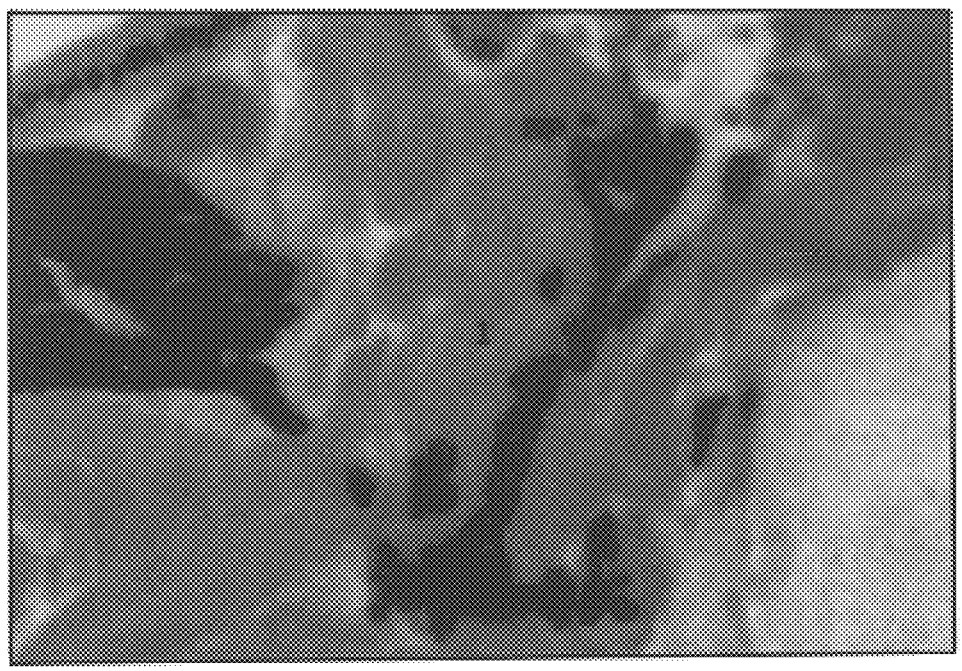
FIG. 5 shows an example of image areas to be quantitatively analyzed and reproduced on a CRT by an autoradiographic image analyzing apparatus which is an embodiment of the present invention.

FIG. 5 shows an example of the thus selected image areas to be quantitatively analyzed on the CRT 50. As shown in FIG. 5, in this example, there are two or more image areas whose density is equal to or higher than the image density lower limit value set by the image density lower limit setting means 102 and equal to or lower than the image density upper limit value set by the image density upper limit setting means 104. Therefore, the operator can ascertain the amount of radiation contained in a particular organ of the test mouse or the like by selecting the quantitative data corresponding to the image areas to be quantitatively analyzed when he or she quantitatively analyzes the image areas.

According to the above described embodiment, even if an image area having higher density than that of the image areas to be quantitatively analyzed is displayed on the CRT 50, it is possible to identify the image areas to be quantitatively analyzed and effect quantitative analysis in a desired manner.

Figure 6:
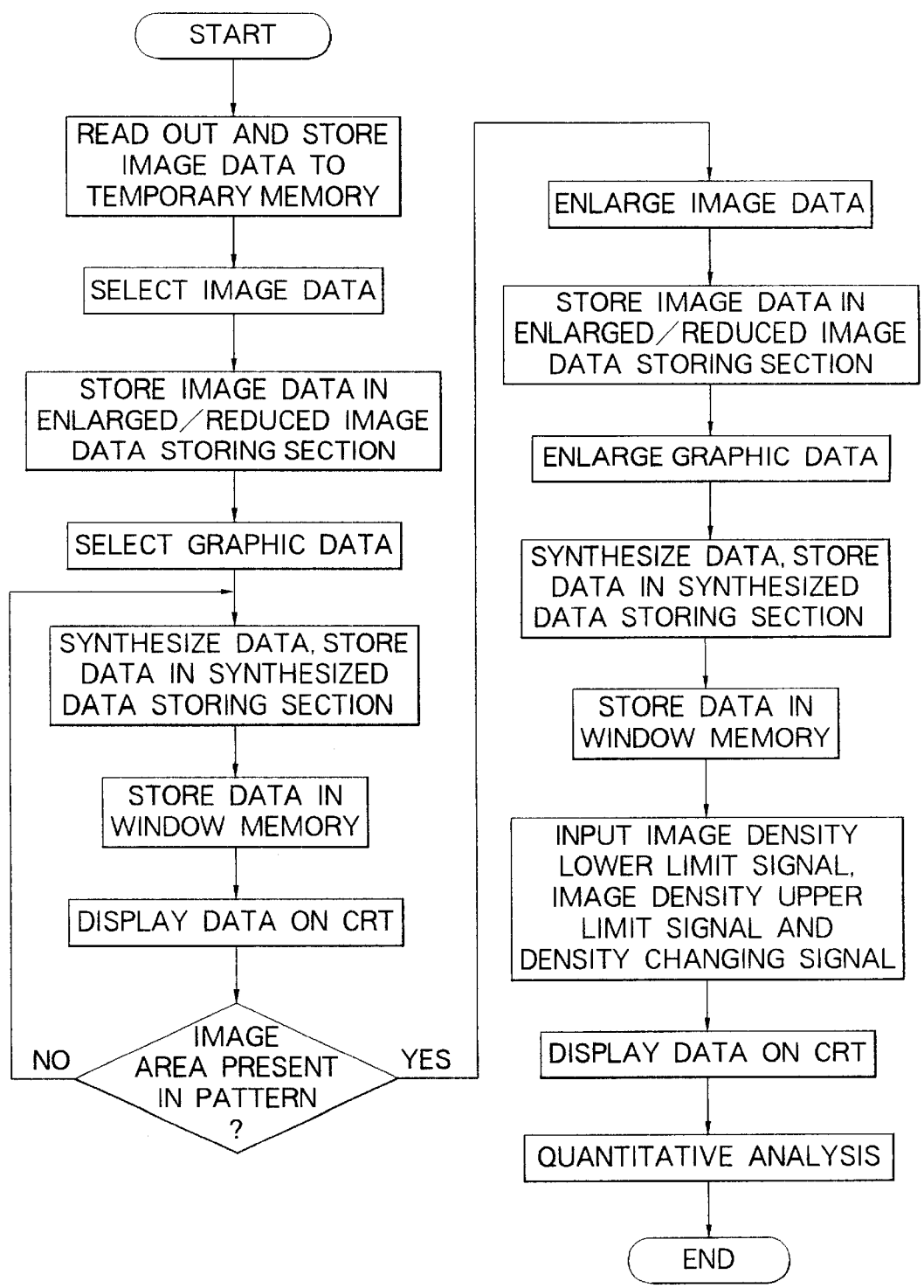
FIG. 6 is a flow chart showing another example of the quantitative analysis procedure effected by an autoradiographic image analyzing apparatus which is an embodiment of the present invention.

FIG. 6 is a flow chart showing an example in which the operator specifies an area containing image areas to be quantitatively analyzed on the CRT 50 using a pattern corresponding to graphic data selected by operating the graphic data selecting means 94 and quantitatively analyzes the image areas.

First, image data to be displayed on the CRT 50 are read out from the image storing section 42 of the image storing means 40 to the temporary memory 66 and two-dimensionally mapped and temporarily stored therein. When the operator inputs an image data selecting signal to the image data selecting section 68 by operating the selected image data determining means 88 with a mouse, image data containing an image area to be viewed and analyzed are selected from among the image data two-dimensionally mapped and temporarily stored in the temporary memory 66. As occasion demands, the operator inputs an enlarging/reducing signal to the image data enlarging/reducing section 70 by operating the image data magnification factor determining means 90 to enlarge or reduce the selected image data and two-dimensionally maps and temporarily stores them in the enlarged/reduced image data storing section 72. Further, the operator sets the tone of the image to be displayed on the CRT 50 by operating the tone setting means 92. Then, the operator selects predetermined graphic data by operating the graphic data selecting means 94 and operates the data synthesis instructing means 96 to cause the data synthesizing section 76 to synthesize the selected predetermined graphic data and the image data stored in the enlarged/reduced image data storing section 72 and store the synthesized data in the synthesized data storing section 77. Next, the operator inputs a data area specifying signal to the data area selecting section 78 by operating the data area. specifying means 98 to select the area of the image data to be displayed on the CRT 50, thereby two-dimensionally mapping and temporarily storing it in the window memory 79. Thus, when an image display instructing signal is input from the image display instructing means 100, the image data and the graphic data two-dimensionally mapped and temporarily stored in the window memory 79 are displayed on the CRT 50 by the image displaying section 82 and an image is reproduced on the CRT 50 so as to have the tone set by the tone setting means 92.

The operator views the thus obtained image and the pattern on the CRT 50 and judges whether or not the image area to be quantitatively analyzed is surrounded and specified by the selected pattern.

When the operator judges that the image area to be quantitatively analyzed is neither surrounded nor specified by the selected pattern, he or she operates the data synthesis instructing means 96 and adjusts the position of the selected predetermined graphic data until the image area to be quantitatively analyzed is surrounded and specified by the selected pattern.

Figure 7:
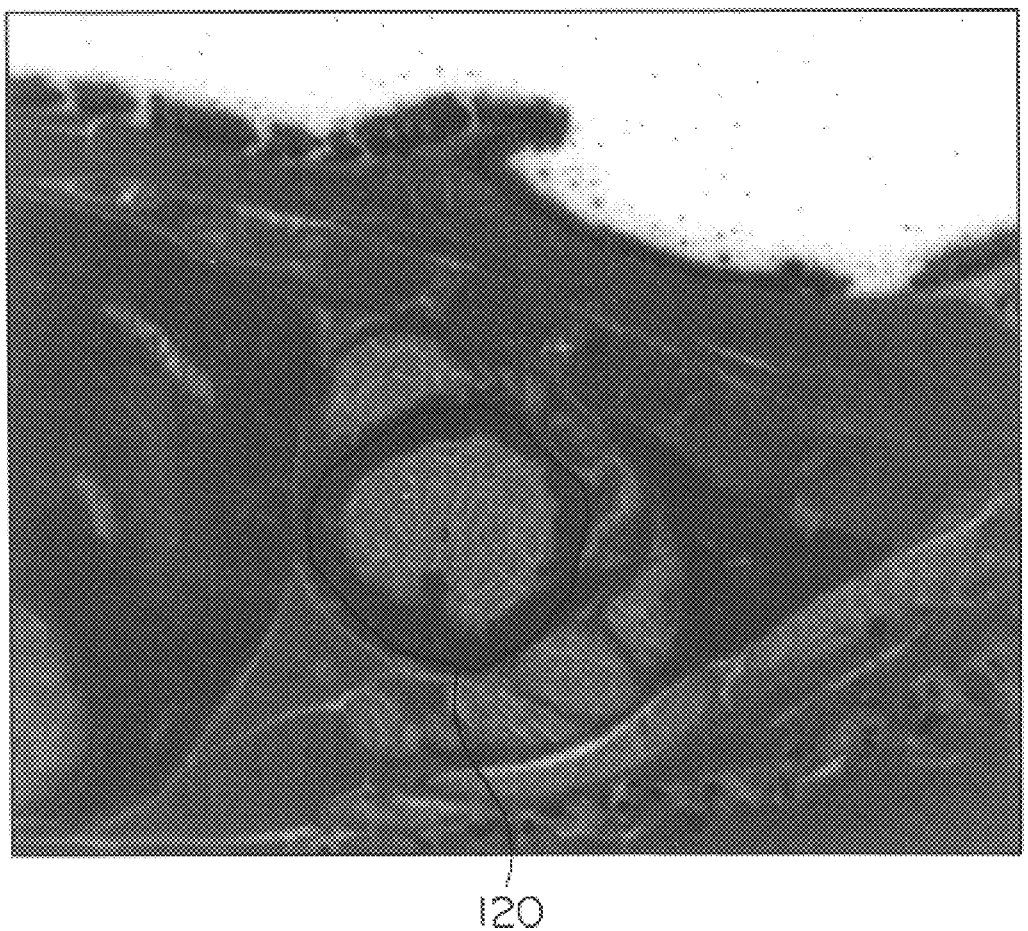
FIG. 7 shows a pattern and an image area reproduced on a CRT by an autoradiographic image analyzing apparatus which is an embodiment of the present invention.
Figure 8:
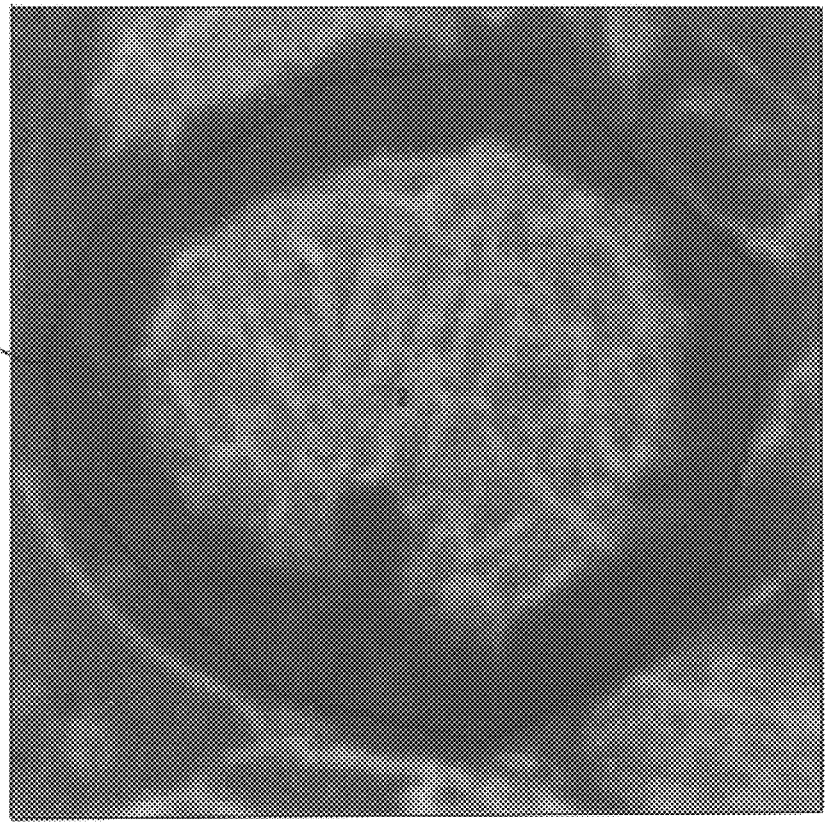
FIG. 8 shows a pattern and an image area enlarged and reproduced on a CRT by an autoradiographic image analyzing apparatus which is an embodiment of the present invention.

As shown in FIG. 7, when the image having the desired tone has been displayed on the CRT 50 and the image area to be quantitatively analyzed has been surrounded and specified by the selected pattern in this manner, the operator outputs an enlarging signal to the image data enlarging/reducing section 70 and the graphic data storing section 74 by operating an image data magnification factor determining means 90 to enlarge the image data corresponding to the image area to be quantitatively analyzed and the graphic data corresponding to the pattern 120 using the same magnification factor, thereby two-dimensionally mapping and temporarily storing the enlarged image data and graphic data in the synthesized data storing section 77. Further, the operator causes the data area selecting section 78 to select a predetermined area of the image data and the graphic data stored in the synthesized data storing section 77 by operating the data area specifying means 98 and two-dimensionally maps and temporarily stores the thus selected predetermined area of the image data and the graphic data in the window memory 79 so as to superpose them on the image data and the graphic data two-dimensionally mapped and temporarily stored therein. FIG. 8 shows an image and a pattern displayed on the CRT 50 based on the image data and the graphic data two-dimensionally mapped and temporarily stored in the window memory 79. As shown in FIG. 8, an image area to be quantitatively analyzed and surrounded by the pattern 120 is enlarged and displayed on the CRT 50.

The operator views the image displayed on the CRT 50 and, in accordance with the density of the specified image area, inputs an image density lower limit setting signal to the image area specifying section 80 by operating the image density lower limit setting means 102 and inputs an image density upper limit setting signal to the image area specifying section 80 by operating the image density upper limit setting means 104, thereby setting the density of the image area surrounded by the pattern 120 and specified to be equal to or higher than the image density lower limit value set by the image density lower limit setting means 102 and equal to or lower than the image density upper limit value set by the image density upper limit setting means 104. Further, the operator inputs a density changing signal to the image area specifying section 80 by operating the density changing means 106 to change the density of the image area surrounded by the pattern 120 and specified to a desired density.

Figure 9:
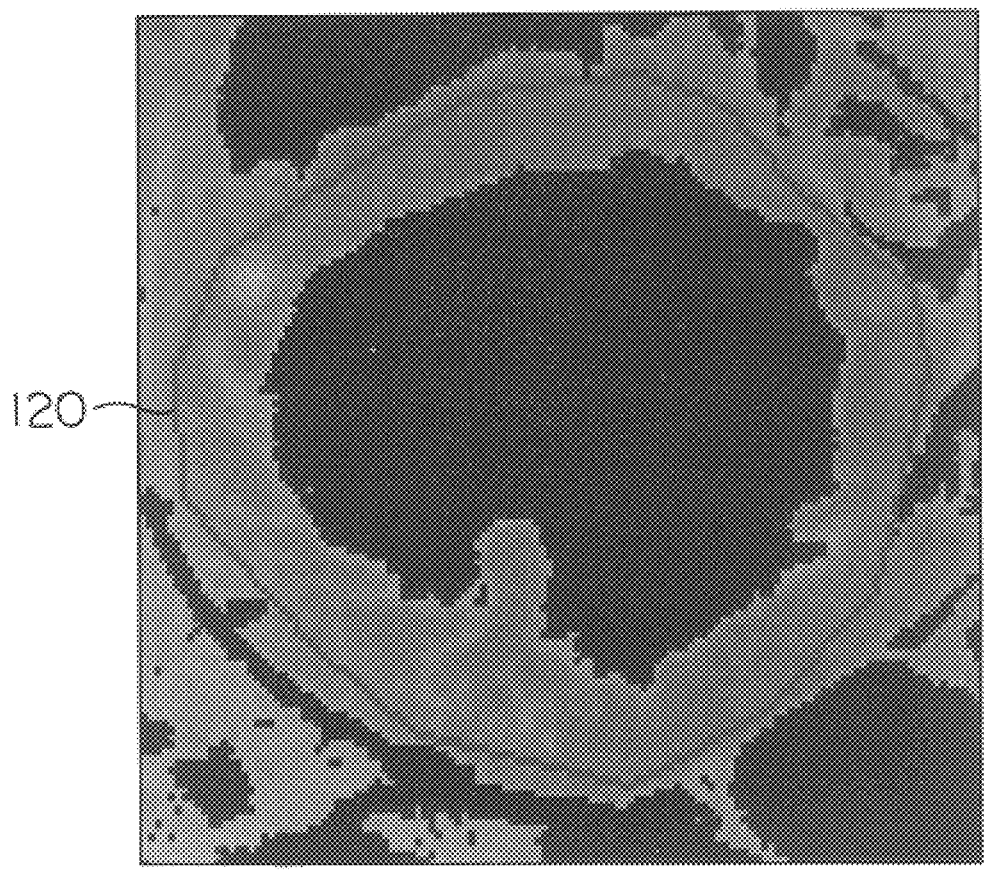
FIG. 9 shows another example of image areas to be quantitatively analyzed and reproduced on a CRT by an autoradiographic image analyzing apparatus which is an embodiment of the present invention.

FIG. 9 shows an example of the thus selected image area to be quantitatively analyzed on the CRT 50. As shown in FIG. 9, in this example, by selecting graphic data and synthesizing the graphic data and the image data, the image area to be quantitatively analyzed is surrounded by the pattern 120 corresponding to the selected graphic data on the CRT 50 and specified and the density of only the image area within the pattern 120 is changed to a desired density.

In view of the above, according to this embodiment, it is possible to specify only the image area to be quantitatively analyzed using a pattern and easily effect quantitative analysis.

Figure 10:
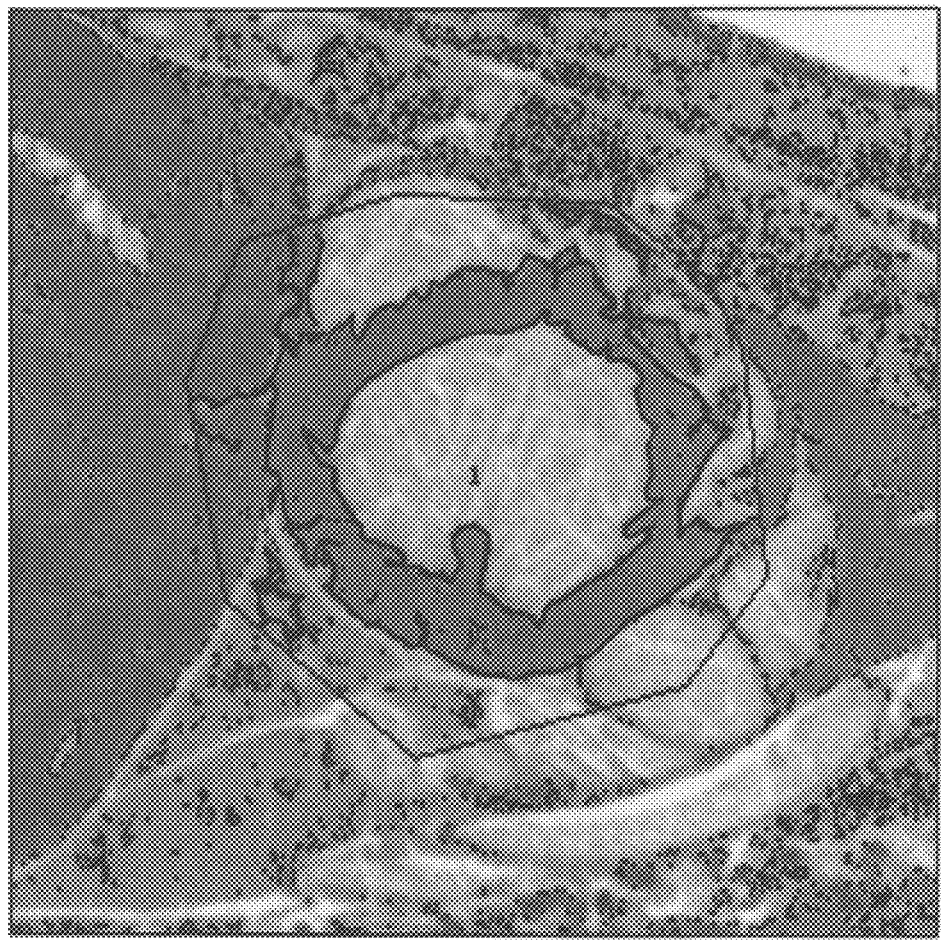
FIG. 10 shows a further example of image areas to be quantitatively analyzed and reproduced on a CRT by an autoradiographic image analyzing apparatus which is an embodiment of the present invention.

It is also possible to specify an image area to be quantitatively analyzed using a pattern similarly to the embodiment shown in FIGS. 6 to 9 and adjust the image density lower limit value and the image density upper limit value so that only an outline portion of the image area to be quantitatively analyzed can be displayed on the CRT 50 with the desired density. FIG. 10 shows the thus obtained image displayed on the CRT 50. According to this embodiment, it is possible to effect quantitative analysis of the desired image area, while an image inside of the image area to be analyzed is being viewed.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the locational information regarding a radioactively labeled substance for studying the metabolism, absorption, excretion path and state of a substance introduced into a test mouse is stored and recorded in the stimulable phosphor sheet 1, photoelectrically read out, data-processed in a predetermined manner and displayed on the CRT 50 and the thus displayed image is quantitatively analyzed. However, the present invention is not limited to such autoradiography and can also be applied to autoradiographic images such as an autoradiographic image of a gene obtained by the Southern blotting method and the hybridization method, an autoradiographic image of a protein produced by thin layer chromatography (TLC), an autoradiographic image produced, by polyacrylamide gel electrophoresis for the separation or identification of a protein or the estimation of the molecular weight or properties of a protein or the like. Further, the present invention is applicable for analyzing chemiluminescent images produced by a chemiluminescent process such as a chemiluminescent image of a gene produced by the Southern blot hybridization method, a chemiluminescent image of a protein produced by thin layer chromatography, a chemiluminescent image produced by polyacrylamide gel electrophoresis for the separation or identification of a protein or the estimation of the molecular weight or properties of a protein or the like. Moreover, the present invention can be widely applied to the analysis of an electron beam transmission image or an electron beam diffraction image of a metal or nonmetal produced by an electron microscope, an electron beam image of tissue of an organism and a radiographic diffraction image of a metal or nonmetal.

Further, although in the above described embodiments a color image is displayed on the CRT 50, a monochrome image may be displayed.

Moreover, in the above described embodiments, although the image data are produced by using the stimulable phosphor sheet 1 and converting locational information regarding a radioactive labeling substance to an electrical signal and are displayed on the CRT 50 as a visible image, it is possible to once form a visible image on a photographic film instead of the stimulable phosphor sheet 1, photoelectrically read the visible image, convert it to an electrical signal and process the thus obtained image data in a similar manner to the above.

Furthermore, in the above described embodiments, although an image is displayed on a CRT 50, it may be displayed on any of various display means other than a CRT 50.

Further, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image analyzing apparatus for forming images on display means such as a CRT based on image data and quantitatively analyzing the images, which can specify a desired image area and quantitatively analyze the image area.

What is claimed is:

1. An image analyzing apparatus for forming images on display means based on image data and effecting quantitative analysis, comprising:

image density lower limit setting means for setting a lower limit value of image density;

image density upper limit setting means for setting an upper limit value of image density;

image area specifying means for specifying image areas having density equal to or higher than the lower limit value of image density set by the image density lower limit setting means and equal to or lower than the upper limit value of image density set by the image density upper limit setting means from among the images displayed on the display means;

image data storing means for storing image data; and memory means for two-dimensionally mapping and temporarily storing the image data stored in the image data storing means, wherein the image area specifying means is adapted to data-process the image data within an image data area corresponding to an image area specified thereby and stored in the memory means so that the image area can be displayed on the display means with predetermined density.

2. An image analyzing apparatus in accordance with claim 1 which further comprises image area outline specifying means for specifying an outline of the image area to be quantitatively analyzed and wherein the image area specifying means is adapted to specify an image area having density equal to or higher than the lower limit value of image density set by the image density lower limit setting means and equal to or lower than the upper limit value of image density set by the image density upper limit setting means in the image contained in the image area within the outline specified by the image area outline specifying means.

3. An image analyzing apparatus in accordance with claim 2 which further comprises graphic data storing means for storing graphic data corresponding to patterns to be displayed on the display means and wherein the image area outline specifying means is adapted to specify the outline of the image area to be analyzed based on the graphic data stored in the graphic data storing means.

4. An image analyzing apparatus in accordance with claim 2 wherein the image data are produced using a stimulable phosphor sheet.

5. An image analyzing apparatus in accordance with claim 2 wherein the image data are constituted by image data selected from a group consisting of autoradiographic image data, radiographic diffraction image data, electron microscopic image data and chemiluminescent image data.

6. An image analyzing apparatus in accordance with claim 5 wherein the autoradiographic image data, the radiographic diffraction image data and the electron microscopic image data are produced by absorbing and storing the energy of a radiation or an electron beam emitted from a specimen in a stimulable phosphor, irradiating the stimulable phosphor with an electromagnetic wave and photoelectrically converting light emitted from the stimulable phosphor.

7. An image analyzing apparatus in accordance with claim 5 wherein the chemiluminescent image data are produced by absorbing and storing the energy of a visible light emitted from a specimen in a stimulable phosphor, irradiating the stimulable phosphor with an electromagnetic wave and photoelectrically converting light emitted from the stimulable phosphor.

8. An image analyzing apparatus in accordance with claim 1 wherein the image data are produced using a stimulable phosphor sheet.

9. An image analyzing apparatus in accordance with claim 1 wherein the image data are constituted by image data selected from a group consisting of autoradiographic image data, radiographic diffraction image data, electron microscopic image data and chemiluminescent image data.

10. An image analyzing apparatus in accordance with claim 9 wherein the autoradiographic image data, the radiographic diffraction image data and the electron microscopic image data are produced by absorbing and storing the energy of a radiation or an electron beam emitted from a specimen in a stimulable phosphor, irradiating the stimulable phosphor with an electromagnetic wave and photoelectrically converting light emitted from the stimulable phosphor.

11. An image analyzing apparatus in accordance with claim 9 wherein the chemiluminescent image data are produced by absorbing and storing the energy of a visible light emitted from a specimen in a stimulable phosphor, irradiating the stimulable phosphor with an electromagnetic wave and photoelectrically converting light emitted from the stimulable phosphor.

12. An image analyzing apparatus for forming images on display means based on image data and effecting quantitative analysis, comprising:

image density lower limit setting means for setting a lower limit value of image density;

image density upper limit setting means for setting an upper limit value of image density;

image area specifying means for specifying image areas having density equal to or higher than the lower limit value of image density set by the image density lower limit setting means and equal to or lower than the upper limit value of image density set by the image density upper limit setting means from among the images displayed on the display means;

image data storing means for storing image data;

memory means for two-dimensionally mapping and temporarily storing the image data stored in the image data storing means, wherein the image area specifying means is adapted to data-process the image data within an image data area corresponding to an image area specified thereby and stored in the memory means so that the image area can be displayed on the display means with predetermined density;

which further comprises image area outline specifying means for specifying an outline of the image area to be quantitatively analyzed and wherein the image area specifying means is adapted to specify an image area having density equal to or higher than the lower limit value of image density set by the image density lower limit setting means and equal to or lower than the upper limit value of image density set by the image density upper limit setting means in the image contained in the image area within the outline specified by the image area outline specifying means; and which further comprises graphic data storing means for storing graphic data corresponding to patterns to be displayed on the display means and wherein the image area outline specifying means is adapted to specify the outline of the image area to be analyzed based on the graphic data stored in the graphic data storing means.

13. An image analyzing apparatus for forming images on display means based on image data and effecting quantitative analysis, comprising:

image density lower limit setting means for setting a lower limit value of image density;

image density upper limit setting means for setting an upper limit value of image density;

image area specifying means for specifying image areas having density equal to or higher than the lower limit value of image density set by the image density lower limit setting means and equal to or lower than the upper limit value of image density set by the image density upper limit setting means from among the images displayed on the display means;

image data storing means for storing image data; and memory means for two-dimensionally mapping and temporarily storing the image data stored in the image data storing means, wherein the image area specifying means is adapted to data-process the image data within an image data area corresponding to an image area specified thereby and stored in the memory means so that the image area can be displayed on the display means with predetermined density;

which further comprises image area outline specifying means for specifying an outline of the image area to be quantitatively analyzed and wherein the image area specifying means is adapted to specify an image area having density equal to or higher than the lower limit value of image density set by the image density lower limit setting means and equal to or lower than the upper limit value of image density set by the image density upper limit setting means in the image contained in the image area within the outline specified by the image area outline specifying means; and which further comprises graphic data storing means for storing graphic data corresponding to patterns to be displayed on the display means and wherein the image area outline specifying means is adapted to specify the outline of the image area to be analyzed based on the graphic data stored in the graphic data storing means;

wherein the memory means comprises temporary memory means for two-dimensionally mapping and temporarily storing image data stored in the image data storing means, selected image data memory means for two-dimensionally mapping and temporarily storing a part of the image data stored in the temporary memory means and enlarged, reduced or unchanged in scale, synthesized data memory means for two-dimensionally mapping and temporarily storing data obtained by synthesizing the image data stored in the selected image data memory means and graphic data stored in the graphic data storing means and window memory means for two-dimensionally mapping and temporarily storing a part of the image data stored in the synthesized data memory means, and which further comprises image data selecting means for selecting a part of the image data stored in the temporary memory means, image data enlarging/reducing means for enlarging or reducing the image data selected by the image data selecting means, data synthesizing means for synthesizing the image data stored in the selected image data memory means and graphic data stored in the graphic data storing means and two-dimensionally mapping and temporarily storing them in the synthesized data memory means and data area selecting means for selecting a part of the areas of the image data and the graphic data stored in the synthesized data memory means and two-dimensionally mapping and temporarily storing said part in the window memory means, and wherein the image area specifying means is adapted to data-process the image data stored in the window memory means so as to specify image areas having density equal to or higher than the lower limit value of image density set by the image density lower limit setting means and equal to or lower than the upper limit value of image density set by the image density upper limit setting means from among the images displayed on the display means.

* * * * *